US008818360B2

(12) United States Patent
Agarwal et al.

(10) Patent No.: US 8,818,360 B2
(45) Date of Patent: Aug. 26, 2014

(54) METHODS, SYSTEMS AND COMPUTER PROGRAM PRODUCTS FOR INTEGRATING ROAMING CONTROL IN A SIGNALING MESSAGE ROUTING NODE

(75) Inventors: Devesh Agarwal, Raleigh, NC (US); Chin-Chuan Chiu, Algonquin, IL (US)

(73) Assignee: Tekelec Global, Inc., Morrisville, NC (US)

( * ) Notice: Subject to any disclaimer, the term of this patent is extended or adjusted under 35 U.S.C. 154(b) by 937 days.

(21) Appl. No.: 11/724,684

(22) Filed: Mar. 15, 2007

(65) Prior Publication Data

US 2007/0218898 A1    Sep. 20, 2007

Related U.S. Application Data

(60) Provisional application No. 60/782,647, filed on Mar. 15, 2006.

(51) Int. Cl.
*H04W 4/00*    (2009.01)
*H04W 36/00*    (2009.01)
*H04W 40/00*    (2009.01)

(52) U.S. Cl.
USPC ........ 455/432.1; 455/433; 455/437; 455/440; 455/445

(58) Field of Classification Search
CPC ..... H04W 36/30; H04W 36/14; H04W 36/32; H04W 8/02; H04W 4/00; H04W 36/00; H04W 40/00
USPC ............... 455/432.1, 444, 433, 437, 440, 445
See application file for complete search history.

(56) References Cited

U.S. PATENT DOCUMENTS

| | | | | |
|---|---|---|---|---|
| 6,327,267 | B1 * | 12/2001 | Valentine et al. | 370/466 |
| 6,516,194 | B2 * | 2/2003 | Hanson | 455/433 |
| 6,603,761 | B1 * | 8/2003 | Wang et al. | 370/352 |
| 6,735,441 | B1 * | 5/2004 | Turgeon et al. | 455/433 |
| 7,079,849 | B2 * | 7/2006 | Hanson | 455/456.1 |
| 7,139,570 | B2 * | 11/2006 | Elkarat et al. | 455/432.3 |
| 7,403,537 | B2 * | 7/2008 | Allison et al. | 370/426 |
| 8,275,355 | B2 * | 9/2012 | Huang et al. | 455/410 |
| 2004/0219935 | A1 * | 11/2004 | McCann et al. | 455/466 |

(Continued)

OTHER PUBLICATIONS

"Managed Roaming Service System Guide," Nabla Communications, Id-010582 Rev A1, 94 pgs. (Copyright 2005).

(Continued)

*Primary Examiner* — Inder Mehra
(74) *Attorney, Agent, or Firm* — Jenkins, Wilson, Taylor & Hunt, P.A.

(57) ABSTRACT

Methods, systems, and computer program products for integrating roaming control in a signaling message routing node are disclosed. In one exemplary implementation, a method for providing roaming control at a signaling message routing node is provided. The method includes receiving a signaling message at a signaling message routing node in a network of a home service provider of a mobile subscriber, the signaling message being generated in response to the mobile subscriber registering in a foreign carrier's network. It is determined whether the mobile subscriber is allowed, by the home service provider, to roam in the foreign carrier's network. In response to determining that mobile subscriber is not allowed to roam in the foreign carrier's network, a response to the signaling message is generated and sent, where the response indicates that mobile subscriber is not allowed to roam in a foreign carrier's network. The steps of the method are performed at a signaling message routing node.

12 Claims, 4 Drawing Sheets

(56) References Cited

U.S. PATENT DOCUMENTS

2005/0232236 A1* 10/2005 Allison et al. ............... 370/352
2006/0111116 A1* 5/2006 Palmer et al. ................ 455/445
2006/0120362 A1* 6/2006 Westman et al. ............ 370/389
2006/0262752 A1* 11/2006 Moore et al. ................. 370/331

OTHER PUBLICATIONS

"Managed Roaming Hosted Intelligent Roaming Redirection," Teleglobe, pp. 1-19 (Publication Date Unknown).

* cited by examiner

METHODS, SYSTEMS AND COMPUTER PROGRAM PRODUCTS FOR INTEGRATING ROAMING CONTROL IN A SIGNALING MESSAGE ROUTING NODE

RELATED APPLICATIONS

The presently disclosed subject matter claims the benefit of U.S. Provisional Patent Application Ser. No. 60/782,647, filed Mar. 15, 2006; the disclosure of which is incorporated herein by reference in its entirety.

TECHNICAL FIELD

The subject matter described herein relates to the control of subscribing mobile devices that roams into foreign public land mobile networks (PLMNs). More specifically, the subject matter relates to methods, systems and computer program products for integrating roaming control in a signaling message routing node, such as signal transfer point (STP).

BACKGROUND

Presently, roaming charges constitute a major expense that a serving mobile operator pays to foreign carriers for connecting calls for the mobile operator's subscribers that roam into a foreign public land mobile network (PLMN). To curtail the expenses on roaming charges associated with using foreign carriers, a serving mobile operator may establish roaming agreements with one or more roaming partners within a specific PLMN. The roaming agreements generally stipulate the manner in which the preferential roaming charges apply bilaterally. Therefore, it is extremely desirable for a serving mobile operator to possess some measure of influence over the selection of foreign carriers that outbound roaming subscribers can use. Unfortunately, current SS7 signaling networks afford mobile operators with little control over which foreign carriers the outbound roaming subscribers select for use. Consequently, this lack of control over the selection of foreign carriers often results in elevated operating costs to the servicing mobile operator as well as less satisfactory quality of service (QoS) provided by the chosen foreign carrier.

Current solutions exist for determining whether a subscriber is allowed to roam in a particular carrier's network. However, these solutions require that queried messages be sent to a dedicated database platform to determine whether the roaming is allowed or not. Requiring specialized query messages and dedicated database platforms increases the cost of the network and the time required to register a mobile subscriber.

Accordingly, a need exists for providing integrated roaming control in a signaling message routing node.

SUMMARY

Methods, systems, and computer program products for integrating roaming control in a signaling message routing node are disclosed. In one exemplary implementation, a method for providing roaming control at a signaling message routing node is provided. The method includes receiving a signaling message at a signaling message routing node in a network of a home service provider of a mobile subscriber, the signaling message being generated in response to the mobile subscriber registering in a foreign carrier's network. It is determined whether the mobile subscriber is allowed to roam in the foreign carrier's network. In response to determining that mobile subscriber is not allowed, by the home service provider, to roam in the foreign carrier's network, a response to the signaling message is generated and sent, where the response indicates that mobile subscriber is not allowed to roam in a foreign carrier's network. The steps of the method are performed at a signaling message routing node.

The term "home location function" is used herein to describe the node in the mobile subscriber's home network that stores current location and subscription information for the subscriber. In SS7-based networks, an example of a home location function is a home location register (HLR). In IP multimedia subsystem networks, an example of a home location function is a home subscriber server (HSS).

The subject matter described herein may be implemented using a computer program product comprising computer executable instructions embodied in a computer readable medium. Exemplary computer readable media suitable for implementing the subject matter described herein include chip memory devices, disc memory devices, application specific integrated circuits, programmable logic devices, and downloadable electrical signals. In addition, a computer program product that implements a subject matter described herein may reside on a single device or computing platform or maybe distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
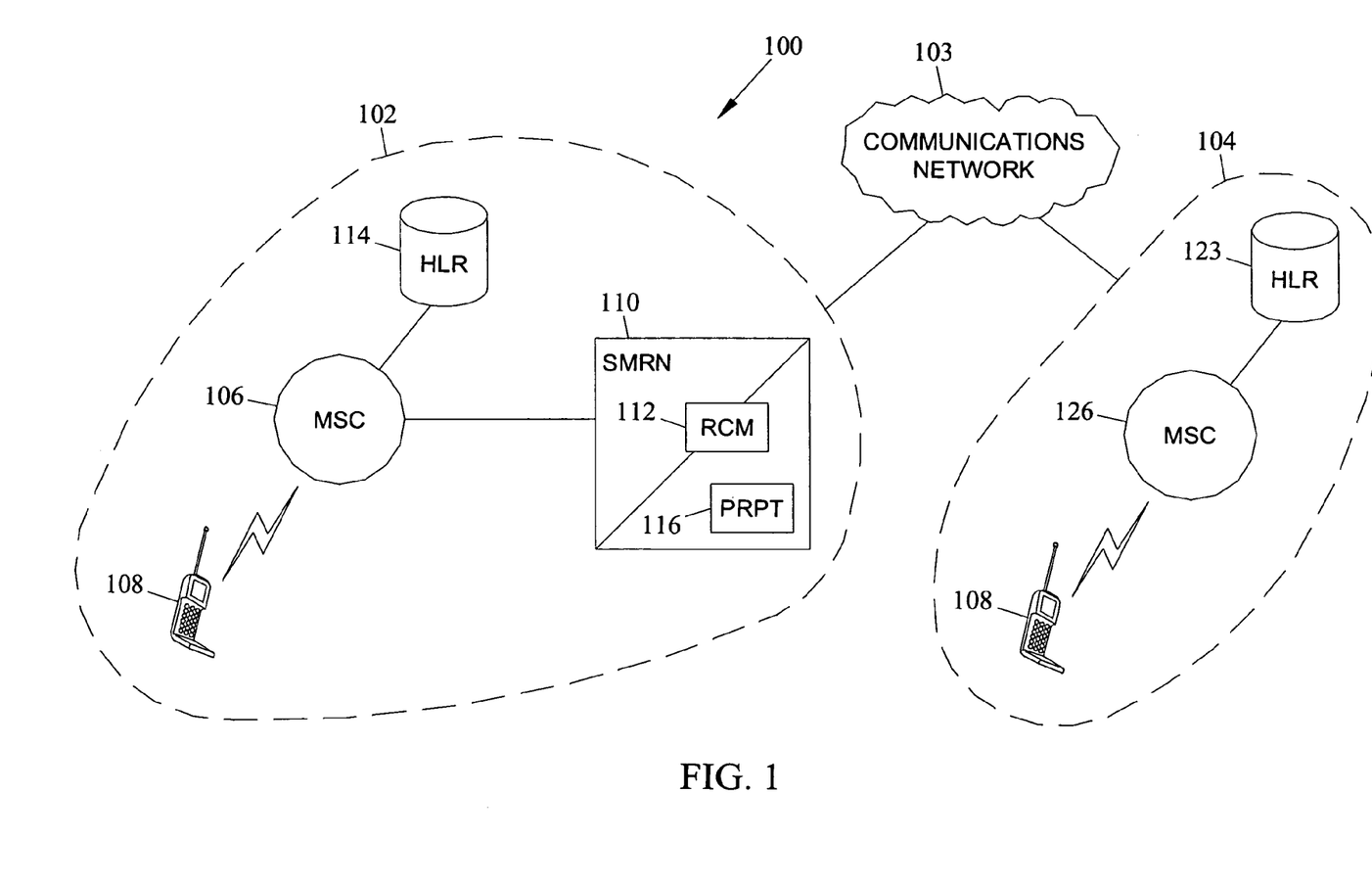
FIG. 1 is a block diagram of an exemplary system for integrating roaming control in a signaling message routing node according to an embodiment of the subject matter described herein.

Methods, systems and computer program products for integrating roaming control in a signaling message routing node are described herein. FIG. 1 is a block diagram of a system for implementing integrated roaming control using a signaling message routing node, such as a signal transfer point (STP), according to an embodiment of the subject matter described herein. Referring to FIG. 1, system 100 includes a home public land mobile network (PLMN) 102, an intermediate or transit communications network 103, and a foreign PLMN 104. A PLMN is a network established and operated by an Administration or a Recognized Private Operating Agency for the specific purpose of providing land mobile communications services to the public. A PLMN may provide service in one frequency band or a combination of frequency bands. A foreign PLMN is a PLMN that differs from the home PLMN where the serving mobile operator is located.

Although only one foreign PLMN 104 is shown in FIG. 1, the subject matter described herein may be used to control mobile subscriber roaming between more than one foreign PLMN without departing from the scope of the subject matter described herein. In one embodiment, home PLMN 102 may include a mobile switching center (MSC) 106, a signaling message routing node (SMRN) 110, and a home location register (HLR) 114, and foreign PLMN 104 may include an MSC 126 and an HLR 123. MSC 126 may include a visitor location register (VLR), a serving GPRS service node (SGSN), or the like. In one embodiment, SMRN 110 may include a signal transfer point (STP) that is used to receive and route signaling messages within PLMN 102. SMRN 110 includes a roaming control module 112 and a PLMN roaming partner table (PRPT) 116. In one embodiment, PLMN roaming partner table 116 may be stored on roaming control module 112. Roaming control module 112 is configured to receive various network messages, e.g., a message generated in response to a mobile subscriber registering in a foreign carrier's network, and determine if the foreign carrier is an approved roaming partner of the roaming subscriber's home service provider. PLMN roaming partner table 116 may include a database or like structure that contains a list of network addresses of approved or "allowed" foreign carriers in a given PLMN. The entries in allowed roaming partner table 111 may be GTT based or point code based. In one example, PLMN roaming partner table 116 may be global title based, where each entry is indexed by ranges of global title addresses, individual global title addresses, or combinations of ranges and individual global title addresses corresponding to foreign networks or network nodes. Table 1 shown below illustrates an example of a PLMN roaming partner table according to an embodiment of the subject matter described herein.

TABLE 1

PLMN Roaming Partner Data

| GTA | Roaming allowed? |
|---|---|
| 9194600000-9194609999 | Y |
| 9194610000-9194619999 | N |
| 9194620000-9194629999 | N |

In Table 1, the left hand column includes ranges of global title addresses corresponding to foreign PLMNs. The right hand column indicates whether roaming is allowed. When signaling message routing node 110 receives a message relating to a registration of a mobile subscriber, roaming control module 112 may extract an SCCP calling party address from the message and use the calling party address to perform a lookup in PLMN roaming partner table 116. For example, assuming that the calling party address is 9194615555. This address falls within the middle entry in Table 1. Accordingly, for this network, roaming is not allowed. As a result, signaling message routing node 110 may respond to a query originator indicating that roaming is not allowed.

The present subject matter is directed to providing a serving mobile operator with roaming control over mobile devices used by its subscribers. In one exemplary scenario, a mobile device 108 roams into foreign PLMN 104. Upon entering foreign PLMN 104, mobile device 108 may initially be provided with a list of foreign carriers that are operating in the foreign PLMN 104. Mobile device 108 is then used to select a given foreign carrier, which will be used to provide communications service, in order to establish a connection with the system 100. Upon selecting a foreign carrier, mobile device 108 issues a registration request to the selected foreign carrier's MSC (e.g., MSC 126). This process is called "handset registration." In one embodiment, a roaming mobile device 108 first registers before any calls may be made. Although mobile device 108 is permitted to select any one of the carriers displayed by the handset in order to initiate the handset registration process, the present subject matter enables a serving mobile operator to determine if the handset registration request shall be allowed with the selected foreign carrier or instead be denied so that the mobile device 108 will be prompted to select an alternative foreign carrier.

In one embodiment, the present subject matter involves an improved roaming management procedure implemented at a signaling message routing node that enables a mobile serving operator to approve or disapprove of a selected foreign carrier. After receiving the registration request message from mobile device 108 (which has roamed into foreign PLMN 104), MSC 126 transmits a signaling message to the home HLR (HLR 114) associated with mobile device 108. In one embodiment, the signaling message may be a Mobile Application Part (MAP) Update_Location_message if the registration request is initiated by a Global System for Mobile Communications (GSM) MSC or VLR. In an alternative embodiment, the signaling message may be a MAP_Update_GPRS_Location_message if the handset registration request is originated by an SGSN within a GSM network with General Packet Radio Service (GPRS). Likewise, the signaling message may be an American National Standards Institute 41 (ANSI-41) Registration Notification INVOKE (REGNOT) message if the handset registration request is initiated by a Code Division Multiple Access/Time Division Multiple Access (CDMA/TDMA) MSC or VLR (or any combination thereof).

MSC 126 sends the signaling message to the network of home HLR 114 and the signaling message may be received or intercepted by SMRN 110. Normally, without the present subject matter, the SMRN 110 just forwards the message to HLR 114, which then proceeds to attempt to authenticate the subscriber information contained in the signaling message. If the subscriber information is authenticated, then HLR 114 returns a response message to the serving MSC. The response message may include a MAP_Update_Location_ACK response message if the home network is a GSM network, a MAP_Update_GPRS_Location_ACK response message if the home network is a GSM network with GPRS, or an ANSI-41 Registration Notification (REGNOT) RETURN RESULT message if the home network is a CDMA/TDMA network. Upon receiving a response message containing a positive acknowledgement from HLR 114, MSC 126 completes the handset registration. Thus, mobile device 108 is capable of communicating in system 100 via the selected foreign carrier.

Figure 2:
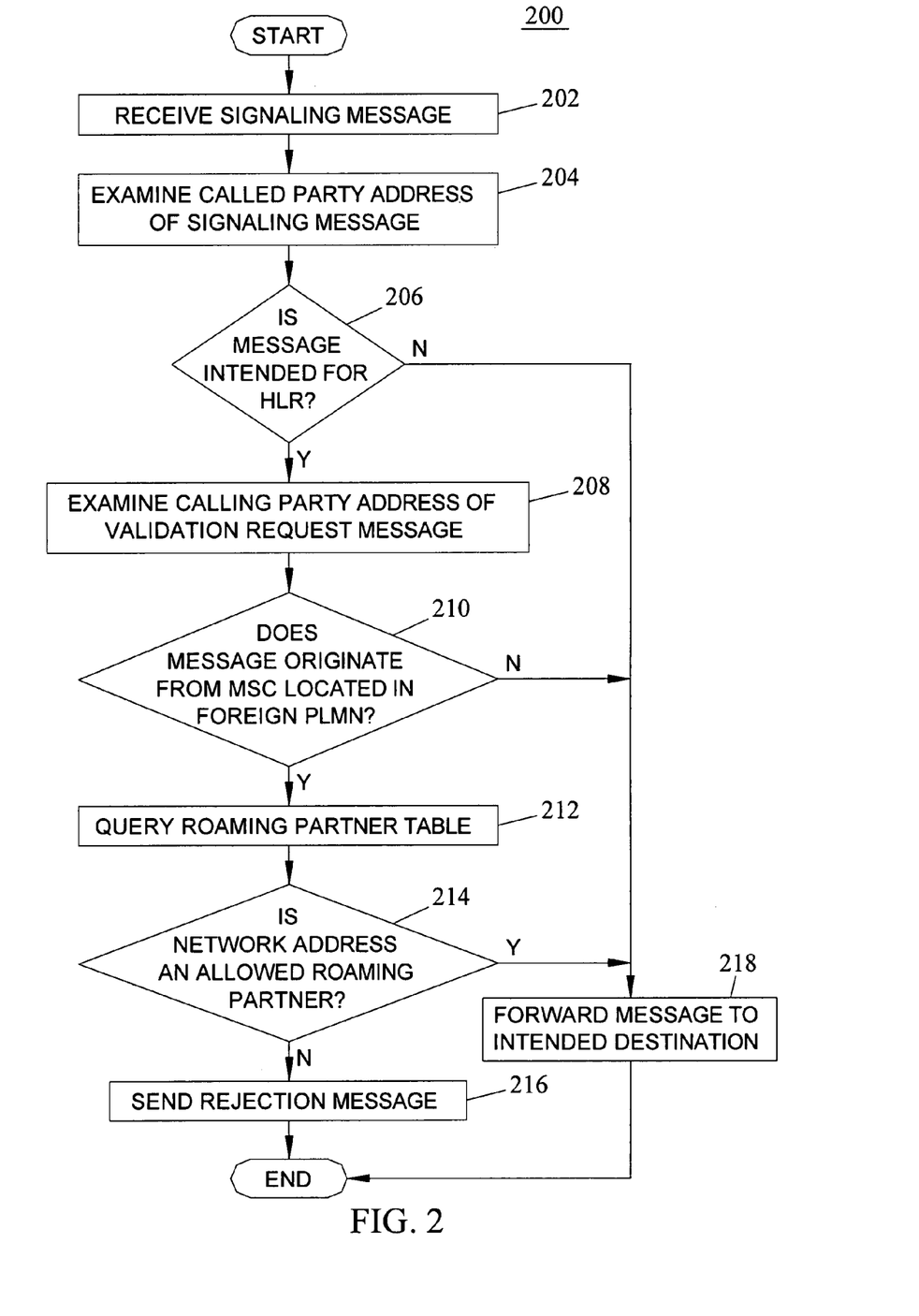
FIG. 2 is a flow chart of a process for performing roaming control via a signaling message routing node according to an embodiment of the subject matter described herein.

As opposed to simply forwarding the signaling message to HLR 114, the present subject matter enables an SMRN to perform additional processing to determine if the signaling message is forwarded to HLR 114 as normal (if a foreign carrier is an approved carrier), or to abort the request (if the foreign carrier is not an approved carrier) so that the roaming mobile device 108 may be informed to re-select an alternative carrier that is available in the area. FIG. 2 is a flow chart of a method 200 for performing roaming control via a signaling message routing node, such as SMRN 110, according to an embodiment of the subject matter described herein. By having the roaming control logic integrated within the SMRN, no additional platform/hardware/node is needed in the network. Similarly, because signaling messages are handled at the SMRN itself, processing times for the messages are much shorter and a fewer number of SS7 links are required. More specifically, the processing times and number of SS7 links are reduced since all the signaling messages do not need to take an additional hop while traversing the network. Referring to FIG. 2, in block 202, a signaling message is received. In one embodiment, SMRN 110 intercepts the signaling message (e.g., an update location message) from MSC 126.

In block 204, the called party address of the signaling message is examined. In one embodiment, SMRN 110 (which is located within home network 102) examines the signaling connection control part (SCCP) Called Party Address (CdPA) field of the signaling message. In another embodiment, SMRN 110 examines the transaction capabilities application part (TCAP) VLR identifier of the signaling message.

In block 206, a determination is made as to whether the signaling message is intended for an HLR located within the mobile subscriber's home network, e.g., HLR 114. If the signaling message is intended for HLR 114, then method 200 proceeds to block 208. Otherwise, method 200 continues to block 218 where the SMRN 110 forwards the message to its intended destination (and SMRN 110 exits the processing).

In block 208, the calling party address of the signaling message is examined. In one embodiment, SMRN 110 examines the SCCP Calling Party Address (CgPA) of the intercepted signaling message to ascertain the message's origin.

In block 210, a determination of whether the signaling message originated from an MSC located in a foreign PLMN. In one embodiment, SMRN 110 determines if the signaling message originates from MSC 126 in PLMN 104 (or some other MSC in any other foreign PLMN). If the signaling message is found to originate from a foreign PLMN (e.g., PLMN 104), then method 200 continues to block 212. Otherwise, method 200 proceeds to block 218, where the message is forwarded by SMRN 110 to its intended destination (and SMRN 110 exits the processing).

In block 212, a roaming partner table is queried. For every foreign PLMN in which the serving mobile operator has at least one roaming partner, SMRN 110 may maintain a unique list of "approved" carriers. More specifically, the list (e.g., roaming partner table 116) includes the network addresses of the allowed carriers. As described above, the list may be referred to as the "PLMN Roaming Partner Table." In one embodiment, SMRN 110 queries the PLMN roaming table 116 using the network address encoded in the SCCP CgPA field of the intercepted signaling message. The network address encoded in the SCCP CgPA field may be the network address of the MSC/VLR/SGSN (e.g., MSC 126) that initiated the handset registration request.

In block 214, a determination is made as to whether the encoded network address is associated with an approved roaming partner. If the network address encoded in the SCCP CgPA field corresponds to one of the "approved" roaming partners, then method 200 proceeds to block 218 where SMRN 110 forwards the message to its intended destination (i.e., to HLR 114) and exits the processing. In one embodiment, HLR 114 then examines the subscriber information in the received signaling message and transmits a response message to MSC 126 in order to conclude the registration process. Otherwise, method 200 continues to block 216 where SMRN 110 transmits a rejection message (e.g., an Update_Location_ACK with "registration denied" message) back to the MSC/VLR/SGSN (e.g., MSC 126). In one embodiment, the rejection message may include a MAP_Location_Update_ACK/REGNOT message or a MAP_Update_GPRS_Location_ACK message encoded with "PLMN Roaming Not Allowed" or "Operator Determined Barring" message. In response, mobile device 108 attempts to register with another foreign carrier.

By controlling the selection of foreign carriers in this manner, the present subject matter is able to operate in a more efficient manner by being able to take advantage of agreements established with foreign roaming partners. Notably, these roaming agreements not only afford lower operating costs (due to decreased roaming charges), but may also stipulate preferential handling of calls that allow for a greater quality of service. In addition, by controlling roaming by intercepting normal registration-related messages at a signaling message routing node, the need for stand-alone special-purpose roaming control databases and signaling to and from such databases in reduced.

Figure 3:
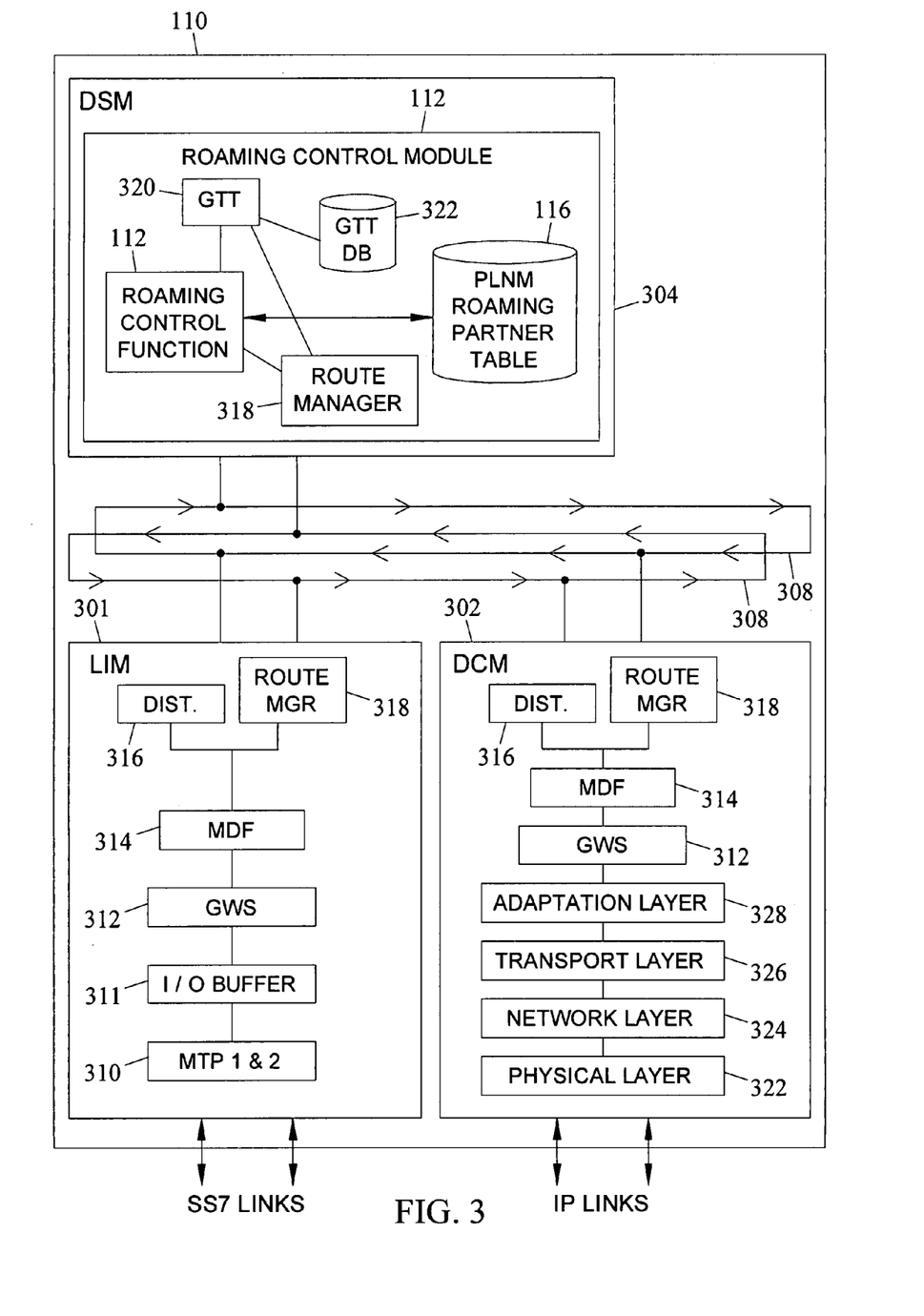
FIG. 3 is a block diagram of an exemplary signaling message routing node integrated with roaming control according to an embodiment of the subject matter described herein.

FIG. 3 is a block diagram of an exemplary internal architecture of a signaling message routing node with integrated roaming control according to an embodiment of the subject matter described herein. Referring to FIG. 3, roaming control module 112 may be located at a signaling message routing node 110, such as a signal transfer point (STP), and include an internal communications bus 308 that includes two counter-rotating serial rings. In one embodiment, the logic for determining whether roaming in a particular PLMN is allowed or not is integrated within the SMRN. No additional platforms, hardware, or nodes are needed to process registration messages or the like in the network. A number of processing modules or cards may be coupled to bus 308. In FIG. 3, bus 308 may be coupled to a communications module, such as a link interface module (LIM) 301, a data communications module (DCM) 302, and a database service module (DSM) 304. These modules are physically connected to bus 308 such that signaling and other types of messages may be routed internally between active cards or modules. For simplicity of illustration, only a single LIM, a single DCM, and a single DSM cards are included in FIG. 3. However, signaling message routing node 110 may include multiple other LIMs, DCMs, DSMs, and other cards, all of which may be simultaneously connected to and communicating via bus 308.

Each module 301, 302, and 304 may execute the applications or functions that reside on each module and control communication with other modules via bus 308. For example, DSM 304 may execute software (e.g., via a processor or the like) that performs the aforementioned roaming control of subscribers located in foreign PLMNs.

LIM 301 may include an SS7 MTP level 1 and 2 function 310, an I/O buffer 311, a gateway screening (GWS) function 312, a message discrimination function 314, a message distribution function 316, and a route manager 318. MTP level 1 and 2 function 310 sends and receives digital data over a particular physical interface, provides error detection, error correction, and sequenced delivery of SS7 message packets. I/O buffer 311 provides temporary buffering of incoming and outgoing signaling messages. Although roaming control module 112 is shown to be located in DSM 304, those skilled in the art realize that roaming control module 112 may be stored on LIM 301.

GWS function 312 examines received message packets and determines whether the message packets should be allowed into signaling message routing node 110 for processing and/or routing. Discrimination function 314 performs discrimination operations, which may include determining whether the received message packet requires processing by an internal processing subsystem or is simply to be through switched (i.e., routed on to another node in the network). Messages that are permitted to enter signaling message routing node 110, such as messages that require GTT and/or roaming control processing, may be routed to other communications modules in the system or distributed to an application engine or processing module via bus 308.

DCM 302 includes functionality for sending and receiving SS7 messages over IP signaling links. In the illustrated example, DCM 302 includes a physical layer function 322, a network layer function 324, a transport layer function 326, an adaptation layer function 328, and functions 312, 316, and 318 described above with regard to LIM 301. Physical layer function 322 performs open systems interconnect (OSI) physical layer operations, such as transmitting messages over an underlying electrical or optical interface. In one example, physical layer function 322 may be implemented using Ethernet. Network layer function 324 performs operations, such as routing messages to other network nodes. In one implementation, network layer function 324 may implement Internet protocol. The transport layer function 326 implements OSI transport layer operations, such as providing connection oriented transport between network nodes, providing connectionless transport between network nodes, or providing stream oriented transport between network nodes. Transport layer function 326 may be implemented using any suitable transport layer protocol, such as stream control transmission protocol (SCTP), transmission control protocol (TCP), or user datagram protocol (UDP). Adaptation layer function 328 performs operations for sending and receiving SS7 messages over IP transport. Adaptation layer function 328 may be implemented using any suitable IETF or other adaptation layer protocol. Examples of suitable protocols include MTP level 2 peer-to-peer user adaptation layer (M2PA), MTP level 3 user adaptation layer (M3UA), and/or signaling connection control part (SCCP) user adaptation layer (SUA). Functions 312, 316, and 318 perform the same operations as the corresponding components described above with regard to LIM 301.

When a signaling message relating to registration of a mobile subscriber in a foreign PLMN is received, the message may first be processed by either LIM 301 or DCM 302, depending on whether the message is sent over an SS7 or an IP signaling link. The message is passed up the communications protocol stack on the receiving communication module until it reaches message discrimination function 314. Discrimination function 314 determines whether the signaling message is intended for signaling message routing node 110 or to another node. In this example, it is assumed that the registration message is sent route on global title and is addressed to the point code of signaling message routing node 110. Accordingly, message discrimination function 314 forwards the message to distribution function 316, which forwards the message to DSM 304. In the illustrated example, DSM 304 includes roaming control function 112 and PLMN roaming partner table 116 previously described. In addition, DSM 304 includes global title translation (GTT) function 320, GTT database 322, and a route manager 318. Roaming control function 112 may examine the message and determine whether the message relates to registration of a mobile subscriber in a foreign network. In response to determining that message relates to registration of a mobile subscriber in a foreign network, roaming control function 112 may determine whether the message is destined for the mobile subscriber's home HLR. Determining whether the message is addressed to the subscriber's home HLR may include analyzing the SCCP called party address in the message, as described above. In response to determining that the message is addressed to the mobile subscriber's home HLR, roaming control function 112 may access PLMN roaming partner table 116 using the calling party address in the message to determine whether the roaming is allowed. If roaming control function 112 determines that the roaming is not allowed, roaming control function 112 may formulate a response to the message indicating that roaming is not allowed, forward the response to route manager 318, and route manager 318 may route the message to the message originator via the appropriate LIM or DCM. In response to determining that roaming is allowed, roaming control function may forward the message to GTT module 320 for global title translation. GTT module 320 may perform a lookup in GTT database 322 to determine the point code and subsystem number of the home HLR and may forward the global title translated message to route manager 318. Router manager 318 may route the message to the subscriber's home HLR via the appropriate LIM or DCM.

Figure 4:
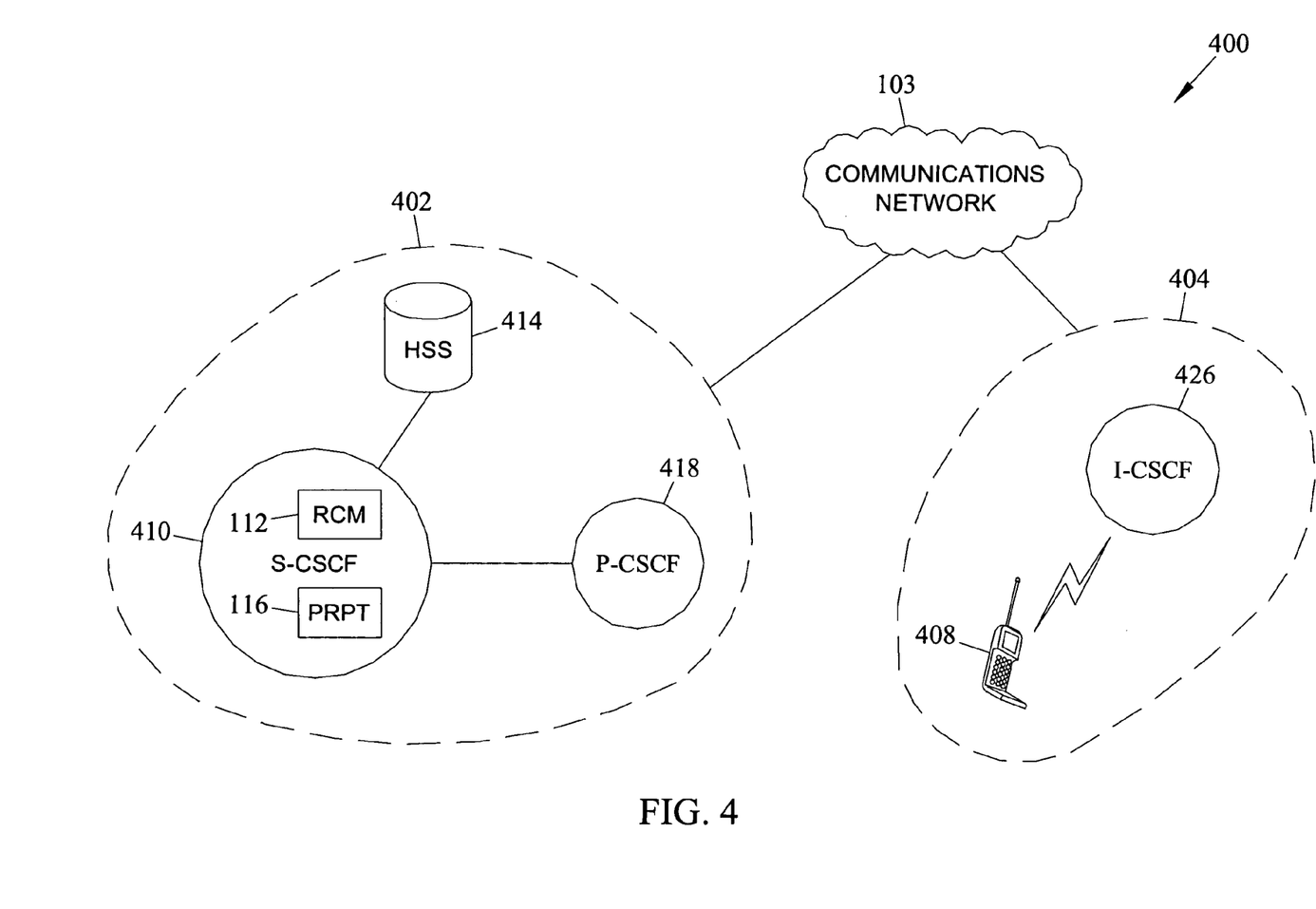
FIG. 4 is a block diagram of an exemplary system for integrating roaming control in a Serving-Call/Session Control Function (S-CSCF) node in an IMS network according to an embodiment of the subject matter described herein.

In the example illustrated in FIG. 1, SMRN 110 comprises an STP located in an SS7 network. In another embodiment, the present subject matter may be applied to an IP multimedia system (IMS) network where the signaling message routing node in which the roaming control functionality described herein is implemented is a serving call session control function (S-CSCF). FIG. 4 is a block diagram of an IMS network 400 for implementing integrated roaming control in an IMS signaling message routing node, such as a serving-call session control function (S-CSCF) node or server, according to an embodiment of the subject matter described herein. Referring to FIG. 4, IMS network 400 includes a home network 402, a communications network 103 and a foreign network 404.

Not unlike the PLMN-related scenario described above, a mobile device 108 roams into foreign network 404. Upon entering foreign network 404, mobile device 108 is initially provided with a list of foreign service providers that are operating in the foreign network 404. Mobile device 108 is then used to select a given foreign service provider, which will be used to establish a connection with IMS network 400. Upon selecting a foreign service provider, mobile device 108 issues a registration request to the selected foreign service provider's interrogating-call session control function (I-CSCF) server 426. In one embodiment, a roaming mobile device first registers before any communications may be made. Although mobile device 108 may be permitted to select any one of the service providers displayed by the mobile device in order to initiate the registration process, the present subject matter enables a home service provider to determine if the registration request shall be allowed with the selected foreign service provider or instead be denied so that the mobile device 108 will be prompted to select an alternative foreign service provider.

After receiving the registration request message from mobile device 108 (which has roamed into foreign network 404), I-CSCF server 426 transmits a signaling message to the home HSS associated with mobile device 108. In one embodiment, the signaling message may include a SIP register message or SIP invite message.

I-CSCF server 426 sends the signaling message to HSS 414, which is located in the home network of the roaming mobile device 108, the signaling message is received or intercepted by proxy-call session control function (P-CSCF) server 418. P-CSCF server 418 then forwards the message to S-CSCF server 410 for further processing. S-CSCF server 410 (which is located within home network 102) examines destination node address information (e.g., in the SIP "To" field). At this point, a determination is made as to whether the signaling message is intended for an HSS located within home network 402, e.g., HSS 414. If the signaling message is not intended for HSS 414, then S-CSCF server 410 forwards the message to its intended destination (and S-CSCF 410 exits the processing). If the signaling message is intended for HSS 414, then originating network identification information in the message is examined. In one embodiment, S-CSCF 410 examines originating party or node information in the message (for example, in the SIP "From" field of the message) to ascertain the message's origin. Afterwards, S-CSCF server 410 determines if the signaling message originates from I-CSCF server 426 in foreign network 404 (or some other I-CSCF sever in any other foreign network). If the message is found not to originate from a foreign network (e.g., foreign network 404), then the message is forwarded by S-CSCF server 410 to its intended destination (and S-CSCF exits the processing). If the signaling message is found to originate from the foreign network, then the S-CSCF server 410 queries PLMN roaming partner table 116. For every foreign network in which the home service provider has at least one roaming partner, S-CSCF server 410 maintains a unique list of "approved" carriers. More specifically, the list (e.g., roaming table 416) includes the network addresses of the allowed foreign service providers. In one embodiment, S-CSCF server 410 queries roaming partner table 116 using the network address encoded in the SIP "From" field of the received signaling message. The network address encoded in the SIP "From" field may be the network address of the I-CSCF server that initiated the registration request.

A determination is then made as to whether the encoded network address is associated with an approved roaming partner. If the network address encoded in the SIP "From" field corresponds to one of the "approved" roaming partners, then the S-CSCF 410 forwards the message to its intended destination (i.e., to HSS 414) and exits the processing. In one embodiment, HSS 414 then examines the subscriber information in the signaling message and transmits a response message to I-CSCF 426 in order to conclude the registration process. If the network address does not correspond to an "approved" roaming partner, then S-CSCF 410 transmits a rejection message back to I-CSCF 426. In response, mobile device 108 attempts to register with another foreign service provider.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing roaming control, comprising:
   at a signaling message routing node separate from a home subscriber server (HSS), wherein the signaling message routing node comprises an IP multimedia subsystem (IMS) serving call session control function (S-CSCF):
   (a) receiving a signaling message at the signaling message routing node in a network of a home service provider of a mobile subscriber, the signaling message being generated in response to the mobile subscriber registering in a foreign carrier's network;
   (b) determining whether the mobile subscriber is allowed, by the home service provider, to roam in the foreign carrier's network;
   (c) in response to determining that the mobile subscriber is not allowed to roam in the foreign carrier's network, generating and sending a response to the signaling message indicating that the mobile subscriber is not allowed to roam in the foreign carrier's network, wherein generating and sending a response to the signaling message is performed instead of sending the signaling message to the HSS, wherein steps (a)-(c) are performed at the signaling message routing node separate from the HSS; and
   (d) in response to determining that the mobile subscriber is allowed to roam in the foreign carrier's network, sending the signaling message to the HSS.

2. The method of claim 1 wherein receiving a signaling message includes receiving one of a MAP update_location message, a MAP_update_GPRS_location message, an ANSI-41 REGNOT message, session initiation protocol (SIP) register message, and a SIP invite message.

3. The method of claim 1 comprising determining whether the signaling message is destined for a home location function in the network of the home service provider as a condition to performing steps (b) and (c).

4. The method of claim 1 wherein determining whether the mobile subscriber is allowed to roam in the foreign carrier's network includes accessing a PLMN roaming partner table located in the signaling message routing node to determine whether the foreign carrier is an allowed roaming partner of a home service provider of the mobile subscriber.

5. The method of claim 4 wherein accessing a PLMN roaming partner table includes performing a lookup in the table using an SCCP calling party address in the signaling message.

6. The method of claim 1 comprising, in response to determining that the mobile subscriber is allowed to roam in the foreign carrier's network, forwarding the signaling message to the mobile subscriber's home location function.

7. A system for providing roaming control in a signaling message routing node, the system comprising:
   a signaling message routing node separate from a home subscriber server (HSS), wherein the signaling message routing node comprises a serving call session control function (S-CSCF), the signaling message routing node including:
   (a) a communication module for sending and receiving signaling messages in a network, the communication module being adapted to receive a signaling message at the signaling message routing node in a network of a home service provider of a mobile subscriber, the signaling message being generated in response to a mobile subscriber registering in a foreign carrier's network; and
   (b) a roaming control module for receiving the signaling message from the interface module, and for:
      (i) determining whether the mobile subscriber is allowed, by the home service provider, to roam in the foreign carrier's network;
      (ii) in response to determining that the mobile subscriber is not allowed to roam in the foreign carrier's network, generating and sending a response to the signaling message indicating that the mobile subscriber is not allowed to roam in the foreign carrier's network, wherein generating and sending a response to the signaling message is performed instead of sending the signaling message to the HSS; and
      (iii) in response to determining that the mobile subscriber is allowed to roam in the foreign carrier's network, sending the signaling message to the HSS.

8. The system of claim 7 wherein the signaling message comprises one of a MAP update_location message, a MAP_update_GPRS_location message, an ANSI-41 REGNOT message, session initiation protocol (SIP) register message, and a SIP invite message.

9. The system of claim 7 wherein the roaming control module is adapted to determine whether the signaling message is destined for a home location function in the network of the home service provider.

10. The system of claim 7 wherein the roaming control module is adapted to access a PLMN roaming partner table to determine whether the mobile subscriber is allowed to roam in the foreign carrier's network.

11. The system of claim 10 wherein the roaming control module is adapted to access the PLMN roaming partner control table using an SCCP calling party in the signaling message.

12. The signaling message routing node of claim 7 wherein the roaming control module is adapted to, in response to determining that mobile subscriber is allowed to roam in the foreign carrier's network, forward the signaling message to the mobile subscriber's home location function.

\* \* \* \* \*